R. SHOCK.
SELF LOADING HAY RACK.
APPLICATION FILED JUNE 8, 1909.
967,071.
Patented Aug. 9, 1910.
4 SHEETS—SHEET 2.
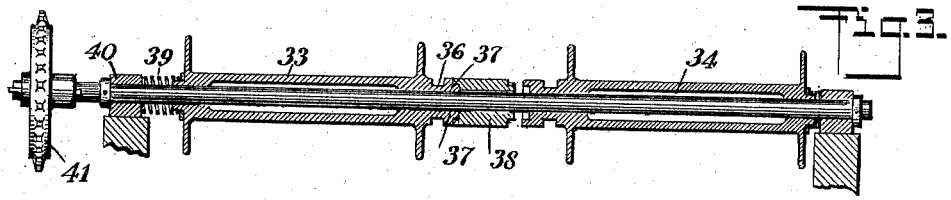
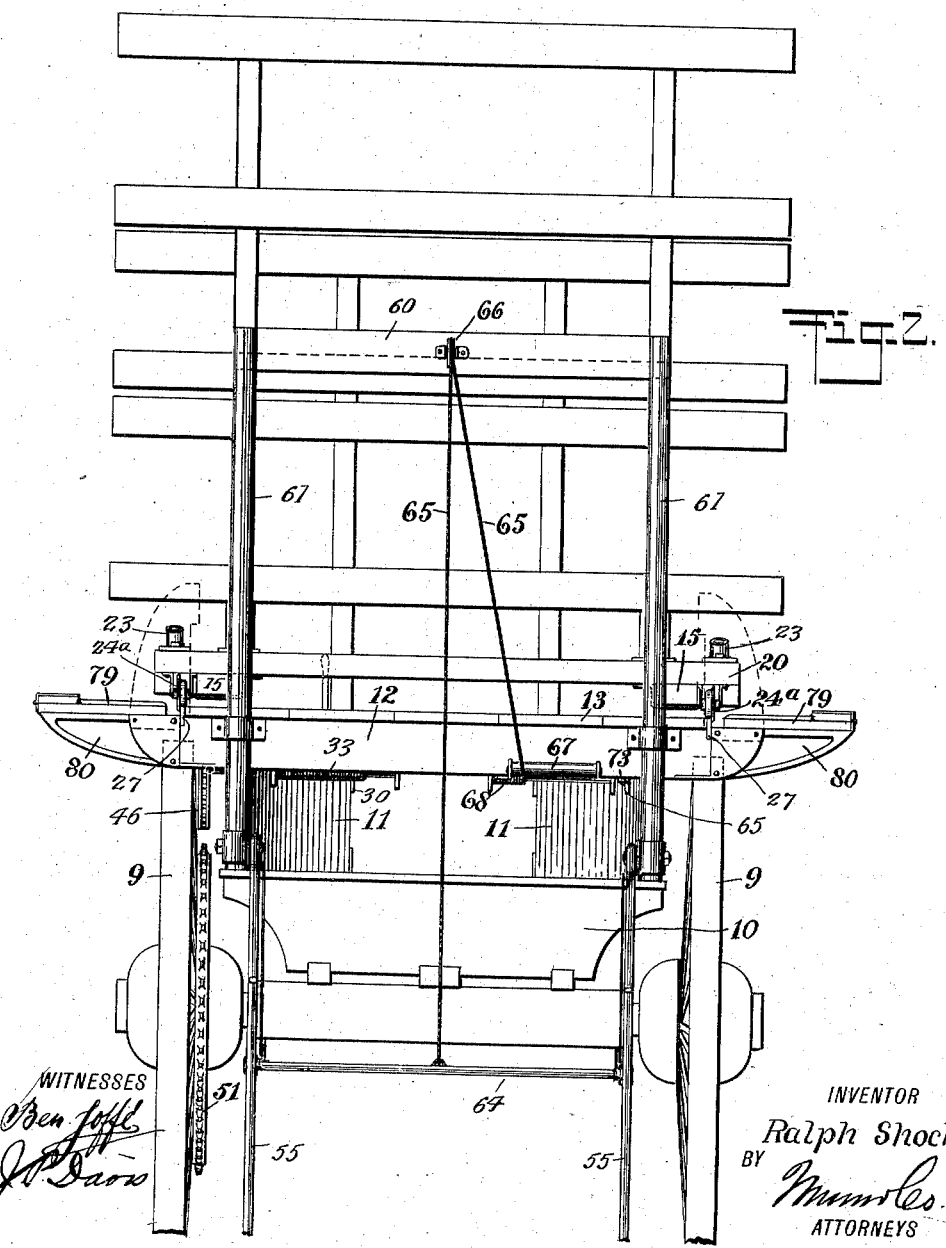
WITNESSES
INVENTOR
Ralph Shock
BY
ATTORNEYS

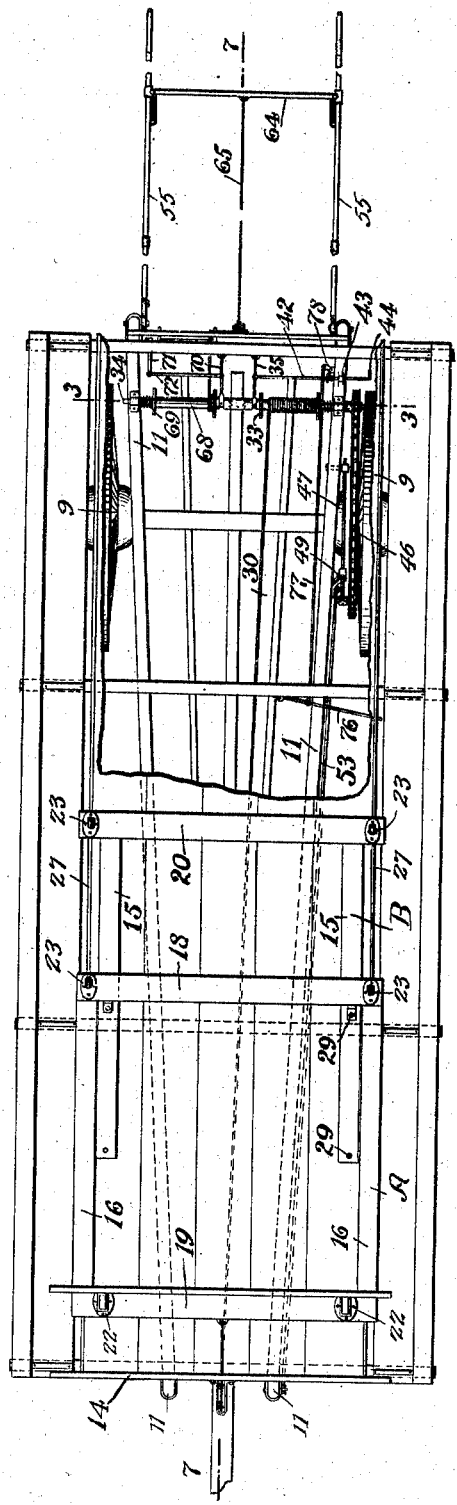

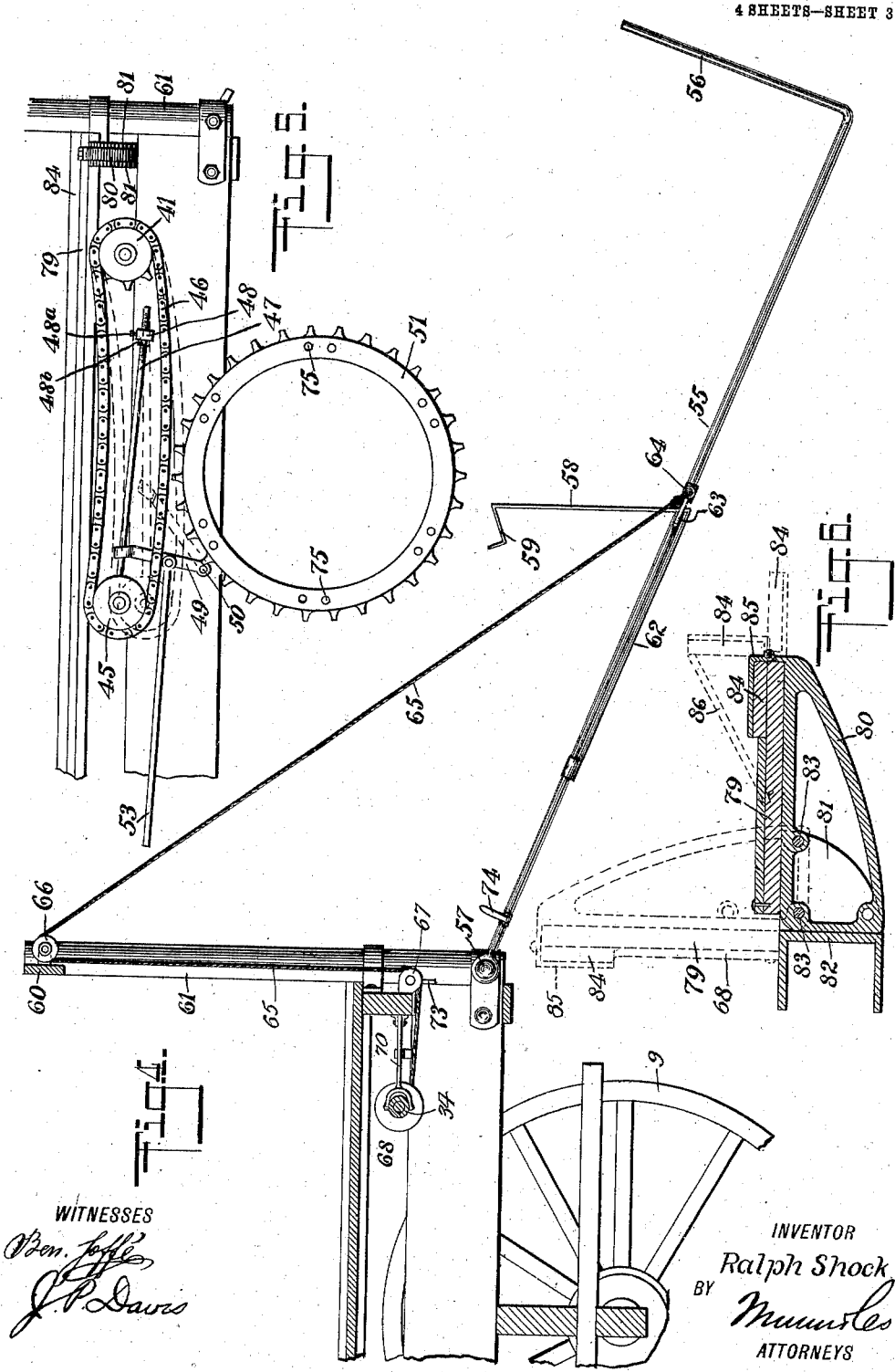

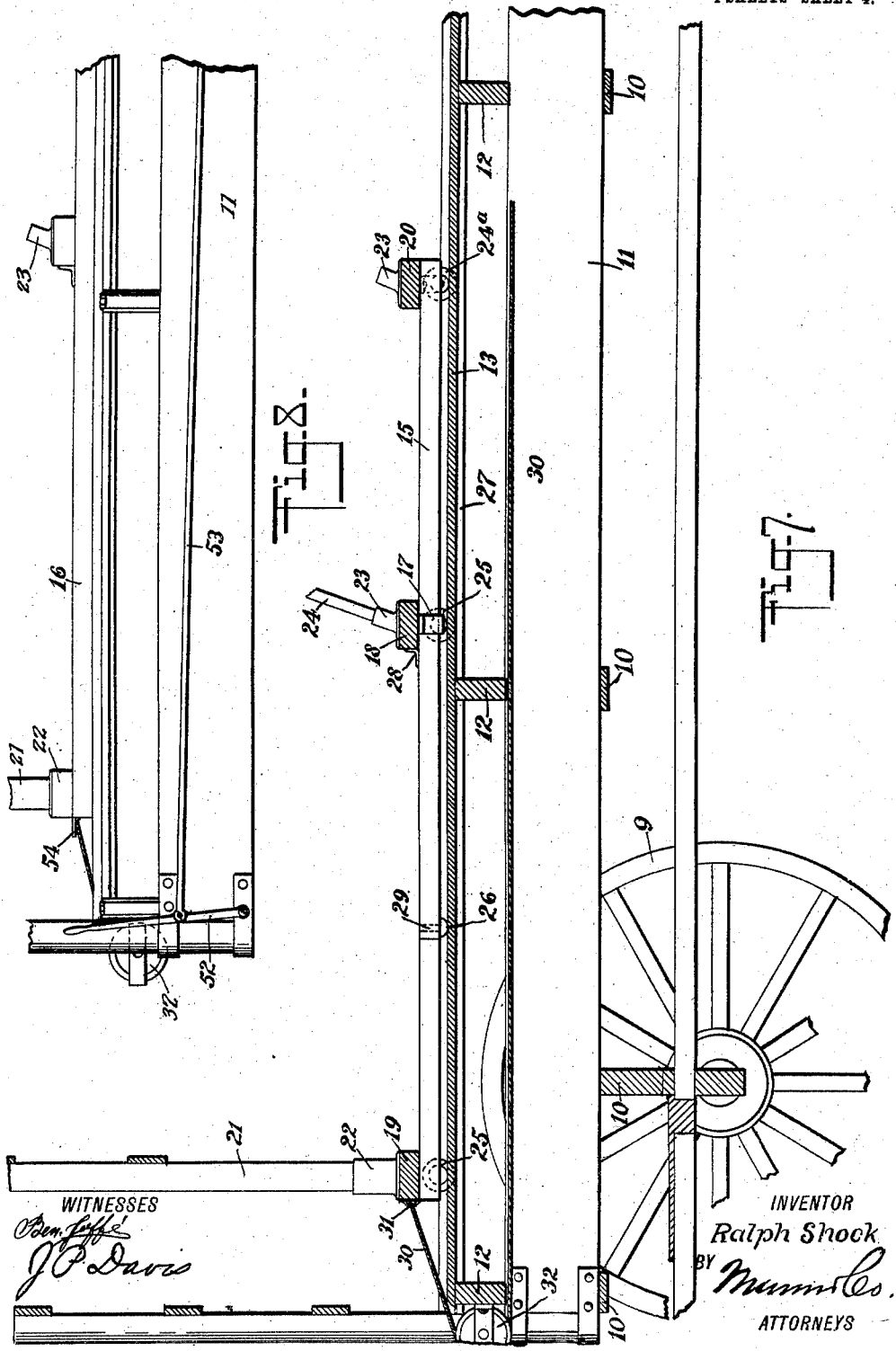

UNITED STATES PATENT OFFICE.

RALPH SHOCK, OF ROCKFORD, OHIO.

SELF-LOADING HAY-RACK.

967,071.　　　　　Specification of Letters Patent.　　Patented Aug. 9, 1910.

Application filed June 8, 1909. Serial No. 500,915.

*To all whom it may concern:*

Be it known that I, RALPH SHOCK, a citizen of the United States, and a resident of Rockford, in the county of Mercer and State of Ohio, have invented a certain new and useful Self-Loading Hay-Rack, of which the following is a full, clear, and exact description.

The objects which the present invention has in view are: to provide racks of the character hereinafter described, having extensible and collapsible body portions; to provide means for distributing the load evenly throughout the vehicle to which the invention is applied; to provide means for loading the vehicle by means of the running gear thereof; and to provide means for automatically disengaging the said loading means.

One embodiment of the invention is shown in the construction illustrated in the accompanying drawings, wherein like characters of reference indicate corresponding parts in all the views.

Figure 1 is a plan view of a vehicle provided with a rack and loading device constructed in accordance with the present invention; Fig. 2 is a rear elevation of a vehicle having applied thereto the rack and loading device constructed in accordance with my invention; Fig. 3 is a longitudinal section taken on the line 3—3 in Fig. 1, the driving shaft being shown in full lines; Fig. 4 is a detail view on an enlarged scale of the rear end of a vehicle, showing the loading device as attached thereto; Fig. 5 is an enlarged detail view of the operating mechanism for the loading and shifting devices; Fig. 6 is an enlarged detail view of the side extension members of the body; Fig. 7 is a longitudinal sectional view of the vehicle body and the racks intended therefor, taken on the line 7—7 in Fig. 1; and Fig. 8 is an enlarged detail of a portion of the vehicle body, showing the rack in position with the lever for disengaging the shifting mechanism.

The instrumentalities described in this specification may be severally grouped under the general heads of the vehicle, the rack and the loading device.

Under the heading of the vehicle, I have grouped the wheels 9, the sills 10, the frame 11, 11, the cross beams 12, the floor 13 and the front rail 14. The structure comprised within this enumeration is similar in all respects to the construction of farm wagons.

The rack consists primarily of two frames A and B, which are collapsible and are each provided with side rails 15, 15 and 16, 16. The rails 15 are guidably mounted in stirrups 17 formed under the cross rail 18. The cross rails 18 and 19 together with the side rails 16, 16 constitute the forward section of the collapsible racks. The rearward extension of the rack is formed by the rails 15, 15 with the cross rail 20. Mounted on the cross rail 19 is an upright frame 21, having side stanchions which fit within sockets 22 with which the cross rail 19 is provided. The frame 21 may be replaced by any variety of frame desired. The cross rails 18 and 20 are provided with sockets 23, into which may be inserted the posts 24, illustrated in the drawings, or, if desired, suitable frame-like constructions similar to that shown at 21. The desirability of the use of any such variation in the construction depends largely upon the material being handled.

The racks are mounted on rollers $24^a$, 25, 25. The rollers 25 are mounted on the side rails 16, 16 at both ends thereof, and the rollers $24^a$ are mounted near the ends of the cross rail 20. The forward ends of the rails 15, 15 are provided with runners 26 which slide over the floor 13. The rollers $24^a$ and 25 are mounted upon metal rails or tracks 27 which are extended longitudinally on the body of the vehicle, and are supported by the cross bars 12. The racks are controlled in their extension by brackets 28, provided with dowel extensions fitted within perforations 29, provided at desired intervals on the rails 15, 15.

The racks are moved toward the forward end of the vehicle by means of the cable 30, which is secured at 31 to the cross rail 19, and is extended around a sheave 32, which is secured at the front end of the body of the vehicle. When the cable 30 is drawn toward the rear of the vehicle, the racks are drawn toward the front of the vehicle. The draft is exerted directly upon the rack section having the rails 18, and 19, and through this section upon the section having the rails 15, 15, and 20 when and as the brackets 28 are impinged upon by the cross rail 18. By means of the adjustment wherein the capacity of the rear section of the racks may be changed, the racks are caused to accommodate themselves to varying uses. In use, these racks are extended to the rear of the vehicle, and the cross rail 20 is moved forward until it is in contact with the cross rail 18. In this position whatever is loaded over the tail of the vehicle is deposited on the floor of the vehicle in advance of the cross rail 18 and the posts 24 or their substituted frames. When the compartment between the frame 21 and the posts 24 has been filled, the cable 30 is drawn upon and the forward section of the racks constituted by the cross rail 19, side rails 16, 16 and cross rail 18, is drawn forward. The rearward section of the racks, constituted by the side rails 15, 15 and cross rail 20, remains stationary until the brackets 28 mounted upon the said side rails are engaged by the cross rail 18, and as soon as this happens, the pull on the cable 30 is suspended. When the rear compartment is filled, the two sections are now drawn forward by means of the cable 30, the rear section traveling with the forward section because of the engagement between the two by means of the brackets 28. The racks do not, as a rule, extend to the full capacity of the body of the vehicle, but are confined in their extension to about two-thirds of the length of the vehicle. Therefore, when the two sections have been moved forward as described, the subsequent load is deposited on the floor of the vehicle at the rear of the posts 24.

The mechanism for actuating the cable 30 as above described, consists of a windlass 33 upon which the cable is wound. This windlass is loosely mounted upon a shaft 34, suitably mounted in bearings on the frame pieces 11, 11. It is slidably mounted upon the shaft 34. The said windlass is moved longitudinally on the said shaft by a yoke-ended lever 35, which engages a slot 36 in the said windlass. The lever may thus move the windlass in both directions. At the end of the windlass next the center of the shaft 34 there is provided a clutch head 37, which is adapted to engage a clutch 38 fixedly mounted upon the shaft 34. To cause the windlass to engage the said clutch 38, it is provided with a spring 39, the expansion of which moves the windlass 33 to engage the clutch head 37 with the clutch 38.

On the end of the shaft 34 beyond a bearing 40, the shaft is provided with a sprocket wheel 41, and the shaft 34 is driven as the sprocket wheel 41 is driven. The windlass 33 is rotated when in engagement with the clutch 38 and not otherwise. The windlass is held out of engagement with the clutch 38 by means of a lever 42 which is extended through suitable bearings 43 mounted on the frame 11, and having a hand hold 44 by which it is drawn so that the lever 35 exerts a pressure on the windlass 33 to carry the clutch head 37 away from the clutch 38. Any suitable detent, automatic or otherwise, may be provided to hold the lever 42 in its adjusted position so that the windlass 33 may be maintained out of engagement with the clutch 38.

The sprocket wheel 41 above mentioned is connected by means of the sprocket chain 46 with an idler sprocket wheel 45. The idler is mounted at the end of a rod 47. The rod 47 is provided on the one end with a screw thread to receive in threaded engagement therewith the nut 48$^b$, which nut is held in adjusted position on the said rod by means of a set screw 48$^a$. The threaded end of the rod 47 is extended through a perforation formed in the pivot bolt 48, the nut 48$^b$ resting against the side of the said pivot bolt and between the same and the wheel 45. By rotating the said nut on the said rod the same is adjusted to and from the end of the said rod, varying the extension thereby of the wheel 45 from the said pivot bolt. By means of this construction any slack in the chain 46 may be taken up.

The free end of the rod 47, upon which is mounted the wheel 45, is supported by a lever 49. The lever 49 is pivoted at 50 on the frame of the vehicle, and is provided at the upper or free end with the perforation through which is passed the said rod 47. The perforation is enlarged so that the lever 49 may be rocked into positions of angular extensions from the said rod without binding upon the same, as shown in dotted lines in Fig. 5 of the drawings. The lever 49 is rocked by the connecting rod 53. By the manipulation of the rod 53, extending the same toward the rear of the vehicle or toward the front thereof, the lever 49 is rocked to lower the chain 46 to engage the teeth of the sprocket wheel 51, as shown in dotted lines in said Fig. 5, or to raise the same out of engagement with the said teeth, as shown in full lines in said figure. The rod 53 is connected pivotally to a hand lever 52, operatively connected with the frame of the vehicle at the forward end thereof.

The lever 52 is operated manually to force the rod 53 toward the rear of the vehicle, to drop the arm 47 so that the chain 46 engages the teeth of the sprocket wheel 51. By drawing the lever toward the front of the vehicle, the rod 53 is moved to raise the arm 47 and carry the chain 46 out of engagement with the wheel 51. This movement of the lever 52 may be made either manually or automatically. In the latter case it is accomplished by a projection 54 which is set out from the forward end of the rail 16 into the path of the lever 52. The rack moving forward by reason of the fact that the drum 33 is engaged with the shaft 34, will project the extension 54 against the lever 52 as the rack arrives at the end of its forward movement, causing the said lever 52 to draw the connecting rod 53 and the lever 49 to raise the arm 47, so as to disengage the chain 46 from the sprocket wheel 51. This action causes the windlass 33 to be arrested in its action, and there is thus safeguarded any breakage of the rack or vehicle or cable.

The loading device with which this vehicle is provided, consists in an elevator comprising side bars 55, 55, the outer ends 56 of which are bent at an upward angle adapted to hold anything which is thrown upon the elevator forward of the said outer ends, the bars being hinged to the body of the vehicle at 57. On the said bars 55 are mounted spring arms 58, the bent ends 59 of which are adapted to grasp a cross rail 60 extended between the stanchions 61 of the rear frame of the vehicle, and in this position to hold the elevator in an upright position during the transit of the vehicle to and from the field. The arms 58 constitute supporting devices for the material being handled, when the elevator is raised to an upright or inclined position during its delivery over the bar 60. The arms 58 are mounted on spring extensions 62, and are guided in loops 63, set out from the side of the bars 55, 55. The elevator frame is shown as having only the two bars 55, but it will be understood that extended between these bars there may be any suitable material such as canvas, duck or open mesh wire. Between the bars 55 there is extended a cross rod 64 at the center of which is connected the cable 65. It is by means of the cable 65 that the elevator when loaded is raised. The cable is extended over a sheave 66 and from thence downward over a roller 67 the width of which permits lateral travel of the cable as the same is wound upon a windlass 68. The windlass 68 is similar in construction to the windlass 33 and is engaged by the shaft 34 through the clutch 38. This engagement of the windlass 68 with the clutch 38, is caused by a spiral spring 69 which forces the windlass into engagement with the said clutch. The engagement between the clutch and the windlass 68 is controlled by a yoke lever 70 which is moved to compress the spring 69 and disengage the windlass 68 from the clutch 38, by a lever 71 to which it is connected by a connecting rod 72. The lever 71 is suitably pivoted to the rail 12 of the vehicle, and has an extension 73 that is extended into the path of the projected member 74 mounted on the bar 55, located on that side of the vehicle. The member 74 impinges upon and moves the end 73 of the lever 71 when and as the elevator is raised to the delivery point. The moving of the extension 73 by the member 74 operates through the connections 72 and the lever 70 to disengage the windlass 68 from the clutch 38 and thereby arrest the action of the windlass, the windlass being held out of engagement as long as the elevator remains in this position. The elevator remains in this position until the end 59 of the arms 58 is lifted out of engagement with the cross rail 60. The windlass 68 may be provided with suitable automatic or manually operated detaining devices, whereby it will be held out of operative position until otherwise desired.

The operation of both windlasses 33 and 68 as above set forth is effected through the shaft 34. The shaft 34 is rotated when the driving chain 46 with which the sprocket wheel 41 is connected is in engagement with the sprocket wheel 51 and when said sprocket wheel 51 is rotated. The sprocket 51 is rotated only when the vehicle is moved, as the said sprocket wheel 51 is secured to the spokes of one of the wheels by means of suitable attaching loops arranged to pass around the spokes and to extend through perforations 75, 75.

In the ordinary operation of my invention, the vehicle is moved when the elevator has received a load. The carrying capacity of the elevator is sufficient to hold most of the material which my invention is designed to handle in the range of any point of stoppage. The operators having deposited upon the elevator the material within said range, the vehicle is moved forward, and in being thus moved the elevator is raised to deposit its load into the tail end of the wagon over the rail 60, and upon the floor of the vehicle. Should it require many elevator loads to fill the rack, the windlass 33 is held out of engagement with the shaft 34 and therefore remains stationary. The lever 35 is influenced to hold the windlass 33 out of engagement by means of a lever 76, to which it is connected through rods 77 and a bell-crank lever 78. The bell-crank lever 78 is pivotally connected on the frame 11 and adapted to retract the rod 42 to withdraw the windlass 33 from engagement with the clutch 38. As stated, the rod 42 is provided with a suitable detent whereby it is held in such position that the windlass 33 is held out of engagement. The position of the lever 76 is more convenient for operation at times than the hand hold 44, the effect of the operation of each being the same. When now as above stated the rack section has become filled, the operator releases the detent which holds the rod 42, and thereby allows the spring 39 to move the windlass 33 to engage with the clutch 38, and in this position the windlass 33 will be rotated in unison with the windlass 68. On the next advance of the vehicle and by the time the elevator deposits its load upon the rack, the latter will have advanced to present the succeeding section. It will be understood that by means of the mechanism securing this co-action and by retreating the racks several times during the operation of loading, the load may be distributed evenly throughout the whole vehicle. When it is desired to stack the load at an extreme height, as when handling straw-like products, the elevator may be used to deposit its successive loads gradually from front to rear in an even manner.

It will be understood that the loading action on the part of the elevator and the advancing action on the part of the racks, are fully controlled by the lever 52, acting through the rod 53, and the lever 49 throws the chain 46 out of engagement with the sprocket wheel, and thereby arrests the rotary action of the shaft 34 and consequently of the two windlasses mounted thereon. Hence, when the vehicle is moving to and from the field, the lever 52 is drawn forward and the rod 53 and lever 49 are compelled to assume the position shown in Fig. 5 of the drawings. In this position the operating mechanisms controlling the racks and the elevator are at rest.

The body of the vehicle when constructed in conformity with the present invention, may be provided with side rails to form a box-like body portion or with extension members that increase the width of the body. This is obtained by mounting side boards 79, 79 upon brackets 80, 80, mounted on extensions 81 of channel members 82. The brackets 80 are secured to the extensions 81 by pins 83, 83, and the brackets are provided with three perforations adapted to receive the pins 83, 83, while the extension 81 is provided with only two perforations at the upper edge of said extension. When the said brackets 80 are placed in the position shown in full lines in Fig. 6 of the drawings, the side boards 79 become an extension of the body portion of the vehicle, and in this position the brackets 80 are held by the pins 83, 83, extending through the two perforations in line with the perforations in the extension 81. When, however, it is desired that the side boards 79 be placed in an upright position to constitute side boards for the wagon body, the outer pin 83 is withdrawn and the bracket 80 swung upon the remaining pin 83, to the dotted position shown in Fig. 6 of the drawings. This presents the third perforation in the bracket 80 to the perforation in the extension 81, and when the pin 83 is then inserted the bracket 80 remains in the upright position shown in dotted lines in said Fig. 6. In this position the side boards 79 form a box-like side to the body portion of the vehicle. Hinged to the side board 79 is a second extension board 84, mounted in a hinged metal strap 85, and when the board is swung on its hinge it will assume either of the two dotted positions shown in Fig. 6. The first of these positions is wherein the board 84 is held in an upright position to form a side rail for the body of the vehicle, at the outer edge of the board 79. The second position is that shown where the board 84 is extended laterally to increase the side dimension of the extension. There is no limitation to the width of the board 84, which may be, if desired, formed of a width equal to that of the board 79. When the board 84 is moved to the upright position, it is held by rods 86 with which the structure is provided.

By means of the construction above described, it will be seen that the vehicle body may be converted into a box body having vertical sides extended to any desired height, or a platform body with extended overhanging sections; that a rack is provided on said body which is expansible and contractible longitudinally on said body; and that a loading appliance is provided for the vehicle, which elevates the load above the vehicle body to a height considerably greater than that convenient to manual operation; and that the operation of the said loading device and the shifting of the rack are in unison, and both are in unison and accord with the movement of the vehicle in the changing of the position of operation.

Having thus described my invention, I claim as new and desire to secure by Letters Patent:

1. A vehicle, comprising suitable running gear and a frame supported thereon, a floor to rest upon said frame to form the body of the vehicle, parallel track rails longitudinally mounted on said frame, a plurality of movable frames having rollers and mounted on said rails to extend across the said floor, adjustable engaging devices for attaching the said movable frames each to the other in predetermined arrangement, racks adapted to be mounted upon said movable frames to extend transversely across the said vehicle, a windlass mounted on said vehicle, a flexible attaching device connected with said frames and adapted to be wound upon said windlass, and a power mechanism embodying the running gear of the vehicle, adapted to rotate the said windlass.

2. A vehicle, comprising suitable running gear and a frame supported therein, parallel track rails mounted longitudinally on said frame, a plurality of movable frames having rollers and mounted on said rails to extend across said frame, adjustable engaging devices for attaching the said movable frames each to the other in predetermined arrangement, racks adapted to be mounted upon said movable frames to extend transversely across the said vehicle, a windlass mounted on said vehicle, a flexible attaching device connected with said frames and adapted to be wound upon said windlass, a power mechanism embodying the running gear of the vehicle, adapted to rotate the said windlass, and suitable means for alternately engaging and disengaging the said windlass and power mechanism.

3. A vehicle, comprising suitable running gear and a frame supported thereon, parallel track rails mounted longitudinally on said frame, a plurality of movable frames having rollers and mounted on said rails to extend across said frame, adjustable engaging devices for attaching the said movable frames each to the other in predetermined arrangement, racks adapted to be mounted upon said movable frames to extend transversely across the said vehicle, a windlass mounted on said vehicle, a flexible attaching device connected with said frames and adapted to be wound upon said windlass, a power mechanism embodying the running gear of the vehicle, adapted to rotate the said windlass, and a suitable means for alternately connecting and disconnecting the said power mechanism and said running gear.

4. A vehicle comprising a suitable running gear and a carrying frame supported thereon; a floor for said frame; parallel track rails mounted on said frame and extended from the rear to the front of said vehicle; a plurality of movable frames having carrying rollers mounted on said rails; a plurality of vertically extended racks mounted on said frames; and means for moving said frames on said rails.

5. A vehicle comprising a suitable running gear and a carrying frame supported thereon; a floor to rest upon said frame; parallel track rails mounted on said frame and so arranged as not to extend above said floor; a plurality of telescopically arranged movable frames having rollers mounted on said rails; suitable devices for operatively connecting the said frames to one another in predetermined arrangement; vertically extended racks mounted upon said frames and extended across the said floor; and means for moving the said frames on said rails.

6. A vehicle comprising a running gear and a frame mounted thereon; a floor to rest upon said frame to form the body of the vehicle; parallel track rails longitudinally mounted on said frame; a plurality of telescopically arranged movable frames having rollers mounted on said rails; adjustable devices connecting the said frames each to the other in predetermined extended arrangement; vertically extended racks mounted upon said frames to extend transversely across the said vehicle; and means for shifting the said frames upon said rails embodying a windlass and cable directly connected to only one of said frames and mounted on said vehicle.

7. A vehicle comprising a running gear and frame supported thereon; a floor resting upon said frame; parallel track rails longitudinally mounted on said frame; a plurality of movable frames having rollers mounted on said rails extending across the said floor; adjustable devices for connecting the said frames to one another in predetermined extended arrangement; vertically extended racks adapted to be mounted upon said frames to extend transversely across the said floor; a windlass mounted on said vehicle; flexible connecting means between one of said frames and said windlass; a power mechanism embodying the running gear of the vehicle adapted to rotate the said windlass; and an automatic releasing device operated by the said frames to arrest the said windlass.

8. A vehicle comprising a running gear and frame supported thereon; a floor resting upon said frame; a plurality of movable frames having rollers mounted on rails extending across the said floor; adjustable devices for connecting the said frames to one another in predetermined extended arrangement; vertically extended racks adapted to be mounted upon said frames to extend transversely across the said floor; a windlass mounted on said vehicle; flexible connecting means between one of said frames and said windlass; a power mechanism embodying the running gear of the vehicle adapted to rotate the said windlass; and a releasing mechanism for arresting the said windlass embodying a lever extended into the traveling path of said frames, and connecting devices operated thereby to disconnect the said windlass and power mechanism.

In testimony whereof I have signed my name to this specification in the presence of two subscribing witnesses.

RALPH SHOCK.

Witnesses:
  SOL SHOCK,
  J. H. WILEY.